(12) United States Patent
Cassidy

(10) Patent No.: US 6,502,166 B1
(45) Date of Patent: Dec. 31, 2002

(54) METHOD AND APPARATUS FOR DISTRIBUTING DATA ACROSS MULTIPLE DISK DRIVES

(75) Inventor: Bruce M. Cassidy, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/474,826

(22) Filed: Dec. 29, 1999

(51) Int. Cl.7 ............................................... G11B 13/00
(52) U.S. Cl. ........................ 711/114; 711/113; 711/112
(58) Field of Search ................................ 711/113, 114, 711/112; 360/55; 369/178.01

(56) References Cited

U.S. PATENT DOCUMENTS

| | | | | |
|---|---|---|---|---|
| 5,412,668 A | * | 5/1995 | Dewey | 714/766 |
| 5,613,085 A | * | 3/1997 | Lee et al. | 711/114 |
| 5,875,456 A | * | 2/1999 | Stallmo et al. | 711/114 |
| 6,035,373 A | * | 3/2000 | Iwata | 711/114 |

OTHER PUBLICATIONS

Rosch, Winn L. "The Winn L. Rosch Hardware Bible". 1994, Sams Publishing. 3rd ed., pp. 994–995, 999, 1003.*

* cited by examiner

*Primary Examiner*—B. James Peikari
(74) *Attorney, Agent, or Firm*—Flehr Hohbach Test Albritton & Herbert LLP; Arthur J. Samodovitz

(57) ABSTRACT

The present invention relates generally to data storage systems having user configurable levels of input/output ("I/O") performance and fault tolerance. To provide exceptional performance to read data requests in a RAID data storage subsystem with 100 percent redundancy, the data striping procedure (22) of the present invention distributes data across disk drives in a data storage subsystem without any backward writes, and thereby provides exception I/O performance with 100 percent data redundancy.

7 Claims, 2 Drawing Sheets

METHOD AND APPARATUS FOR DISTRIBUTING DATA ACROSS MULTIPLE DISK DRIVES

FIELD OF THE INVENTION

The present invention relates generally to data storage systems having user configurable levels of input/output ("I/O") performance and fault tolerance. More particularly, the present invention relates to a system, apparatus, and method for distributing data across multiple disk drives that provides exceptional levels of I/O performance and one-hundred percent data redundancy.

BACKGROUND OF THE INVENTION

Disk drives in all computer systems are susceptible to failures caused by temperature variations, head crashes, motor failure, controller failure, and changing voltage conditions. Modem computer systems require, or at least benefit from, a fault-tolerant data storage system, for protecting data in the data storage system against instances of disk drive failure. One approach to meeting this need is to provide a redundant array of independent disks (RAID) system operated by a disk array controller (controller).

A RAID system typically includes a single standalone controller, or multiple independent controllers, wherein each controller operates independently with respect to the other controllers. A controller is generally coupled across one or more input/output (I/O) buses both to a an array of disk drives and also to one or more host computers. The controller processes I/O requests from the one or more host computers to the rack of disk drives. Such I/O requests include, for example, Small Computer System Interface (SCSI) I/O requests, which are known in the art.

Such a RAID system provides fault tolerance to the one or more host computers, at a disk drive level. In other words, if one or more disk drives fail, the controller can typically rebuild any data from the one or more failed disk drives onto any surviving disk drives. In this manner, the RAID system handles most disk drive failures without interrupting any host computer I/O requests.

Fundamental to RAID technology, is the concept of "striping," or dividing a body of data, from a host computer, into data segments and distributing the data segments in a well-defined manner across each disk drive in the disk drive array. In this manner, the disk drive array becomes, in effect, one logical storage unit as far as a host computer is concerned. There are a number of well known data striping techniques, or RAID levels, including RAID levels 0–6. A numerically higher RAID level does not imply an increase to the disk subsystem's fault tolerance (reliability), I/O performance and scalability. Instead, the numerical levels refer to different techniques that balance various levels of reliability, I/O performance and scalability.

To illustrate this balance, consider that RAID level 0 has exceptional I/O performance because, as data is written to or read from the disk drive array in response to a group, or an ensemble of I/O requests, each disk drive, or spindle in the array comes into play to satisfy the I/O requests. Optimal I/O performance is realized in systems that use RAID level 0, because each disk drive, or spindle in the array comes into play to satisfy the ensemble of I/O requests.

However, RAID level 0 is redundant in name only, and offers no fault tolerance. If RAID level 0 were fault tolerant, the techniques typically used to provide fault tolerance would slow down the I/O performance typically available through the use of RAID level 0. Because RAID level 0 is not fault tolerant, it is not a viable solution in systems that require reliability.

Fault tolerance in case of disk drive failure is typically provided by a number of different techniques. These techniques include disk drive mirroring and data mirroring. Disk drive mirroring involves duplicating an original datum that is stored on a first disk drive, and storing the duplicate datum on a second disk drive. RAID levels 1 and 0+1 use disk drive mirroring to provide fault tolerance to a data storage subsystem. Disk drive mirroring also provides one-hundred percent redundancy of data that virtually eliminates RAID system interruption due to a single disk drive failure.

There are a number of problems with data striping techniques (RAID levels) that use disk drive mirroring to increase fault tolerance. One problem is that disk drive mirroring sacrifices I/O performance for fault tolerance. For example, consider that in a data storage subsystem implemented with either RAID level 1 or RAID level 0+1, only one-half of the disk drives are used to satisfy any read request from a host computer. The disk drives that are used to satisfy a read data request are the disk drives have original data stored on them. (The other one-half of the disk drives only come into play only if a primary disk drive fails, wherein the duplicate data is used to satisfy the read request). As noted above, optimal I/O performance is only realized if each disk drive, or spindle in the array comes into play to satisfy the I/O request. Therefore, RAID levels that use disk drive mirroring are not viable solutions for systems that require fast response to read data requests.

RAID level 6 data striping techniques use data mirroring, as compared to disk drive mirroring. Data mirroring also means that each original data is mirrored across the disk drives. However, using data mirroring, original data is typically not mirrored on a dedicated mirror disk drive, as is done in RAID levels that use disk drive mirroring. This means that it is possible to distribute the data across the disk drives in a manner that provides optimal read data request performance.

To illustrate data mirroring according to RAID level 6, refer to Table 1, where there are shown aspects of RAID level 6 data striping techniques according to the state of the art.

TABLE 1

Example of RAID-6

| Drive 1 | Drive 2 | Drive 3 | |
|---------|---------|---------|----------|
| A       | B       | C       | stripe 0 |
| C'      | A'      | B'      | stripe 1 |
| D       | E       | F       | stripe 2 |
| F'      | D'      | E'      | stripe 3 |

The first three vertical columns represent disk drives 1–3 and are respectively labeled "Drive 1", "Drive 2", and "Drive 3". Horizontal rows, stripes 0–3, represent "stripes of data," where original and duplicate data are respectively distributed across the disk drives 1–3 in the disk drive 1–3 array. Original data is stored on disk drives 1–3 respectively in data segments A, B, C, D, E, and F. Mirrored data, or duplicate data are respectively stored on disk drives 1–3 in data segments A', B', C', D', E', and F'. For example, data segment A' contains a duplicate of the original data contained in data segment A, B' contains a duplicate of the original data contained in B, C' contains a duplicate of the original data contained in C, and the like.

Stripe 0 includes original data in data segments A–C, and stripe 1 contains respective duplicates of original data in data segments A'–C'. Stripe 2 includes original data in data segments D–F, and stripe 3 contains respective duplicates of original data in data segments D'–F'. As can be seen, RAID level 6 stores duplicate data in data segments A'–F' on different disk drives 1–3 than the corresponding original data in data segments A–F. To accomplish this, the RAID level 6 data striping algorithm will rotate to the right by one data segment, a copy of the original data in each respective data segment in the immediately proceeding stripe.

This rotation to the right by one data segment before writing the duplicate data introduces an undesirable amount of rotational delay into a data storage subsystem that uses RAID level 6. Such rotational delay slows down the data storage subsystem performance in response to sequential write data requests. To understand why this is the case, it is helpful to understand how a write data request is handled by a disk drive 1–3.

Each disk drive 1–3 is organized into a plurality of platters, each of which has two recordable disk surfaces. (Individual platters and disk surfaces are not shown) Each platter surface is divided into concentric circles called "tracks". Each track is in turn divided into a plurality of "sectors". Each sector has an associated logical block address (LBA). (Such disk drive 1–3 organization is known in the art).

The first step to a write data onto a platter of a disk drive 1–3, is for a read/write disk head (disk head) to move until it is over the proper track. (Individual read/write disk heads are not shown). This operation is called a "seek", and the time to move the disk head until it is over the the proper track is called the "seek time". Once the correct track has been reached, we must wait for the desired sector to rotate under the disk head. This time is called the "rotational delay".

A simple example can be used to illustrate rotational delay. Referring to Table 1, it can be seen that before duplicate data can be written into data segment A' in disk drive 2, the platter in disk drive 2 must be rotated until the correct logical block (LB) is under the disk head. Although individual LBs are not shown, the correct LB includes the start of a desired data segment A–G'. In this example, the correct LB contains the start of data segment A'. (LBs are organized in a disk drive 1–3 in a sequential manner, such that a first LB has a lower LBA than a second, subsequent LB).

To process a next, sequential write data request, illustrated by the data in data segment B, the platter in disk drive 2 must be rotated until a LB with a lower LBA is underneath the disk head. The amount of platter rotation required to write this next data into data segment B is nearly a complete, 360 degree platter rotation. To process a next, sequential write data request, illustrated by the data in data segment B, the platter in disk drive 2 must be rotated until a LB with a lower LBA is underneath the disk head. Only at this point will the next data be written into data segment B.

The procedure of writing data to a disk drive 1–3 by rotating the platter in a disk drive 1–3 from a LB with a higher LBA, to a LB with a lower LBA, is known as a backward write. As a general rule, using RAID level 6 to sequentially stripe data across disk drives 1–3, every disk drive 1–3 other than the first disk drive 1–3 will be required to perform backward writes. For example, disk drives 2–3 are shown to have performed backward writes to write data into respective data segments B, C, E and F.

Ideally, the data, original or duplicate data, would always be stored in a respective disk drive 1–3 by rotating the platter in the respective disk drive 1–3 to a LB with a higher LBA for each subsequent write data operation, without requiring such backward writes. Otherwise, as is evidenced by using RAID level 6 techniques to stripe data across disk drives 1–3, such sequential backward writes slow down data storage subsystem performance by introducing undesirable amounts of rotational delay into the data storage subsystem. Therefore, RAID level 6 is not a viable solution for data storage subsystems that require high write data performance.

Another problem with the state of the art data striping techniques is that they are not typically scalable across either an even or an odd number of disk drives. It would be cost-efficient and desirable for a data striping technique to be scalable across either an even number or an odd number of disk drives, so that available hardware resources can be fully utilized. For example, RAID level 1 requires an even number of disk drives, and is not scalable to an odd number of disk drives, and RAID level 0+1 requires an even number of disk drives. Neither of these RAID levels are scalable across an odd number of disk drives.

In light of the above, what is needed is a new procedure for striping data across disk drives in a disk drive array that delivers exceptional, or RAID-0 levels of I/O performance for sequential I/O requests without sacrificing high levels of reliability. To accomplish this, the desired data striping technique will not perform backward writes in response to sequential write data requests. Additionally, the desired data striping technique will be scalable across either an even number of disk drives or an odd number of disk drives greater than two disk drives. (The number of disk drives is greater than 2 disk drives because at least 2 disk drives are required to provide data redundancy to a data storage system).

SUMMARY OF THE INVENTION

Heretofore, the state of the art was limited by data storage and retrieval procedures that: (a) while providing for 100% data redundancy, do not provide optimal performance for sequential write data requests; and, (b) are not typically scalable across both an even or an odd number of disk drives. The present invention provides a solution for these limitations.

In one aspect, the present invention a controller receives a plurality of write data requests from a host computer. Each write data request includes data. In response to receiving the write data requests, the controller stores the data across the disk drives according to a data striping procedure. In a data stripe that includes substantially original data, the data are distributed across the disk drives according to a first rule. In a data stripe that includes substantially duplicate data, data are distributed across the disk drives according to a second rule. The data stripes that have substantially original data are interleaved with the data stripes that have substantially duplicate data.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF EMBODIMENTS OF THE INVENTION

Figure 1:
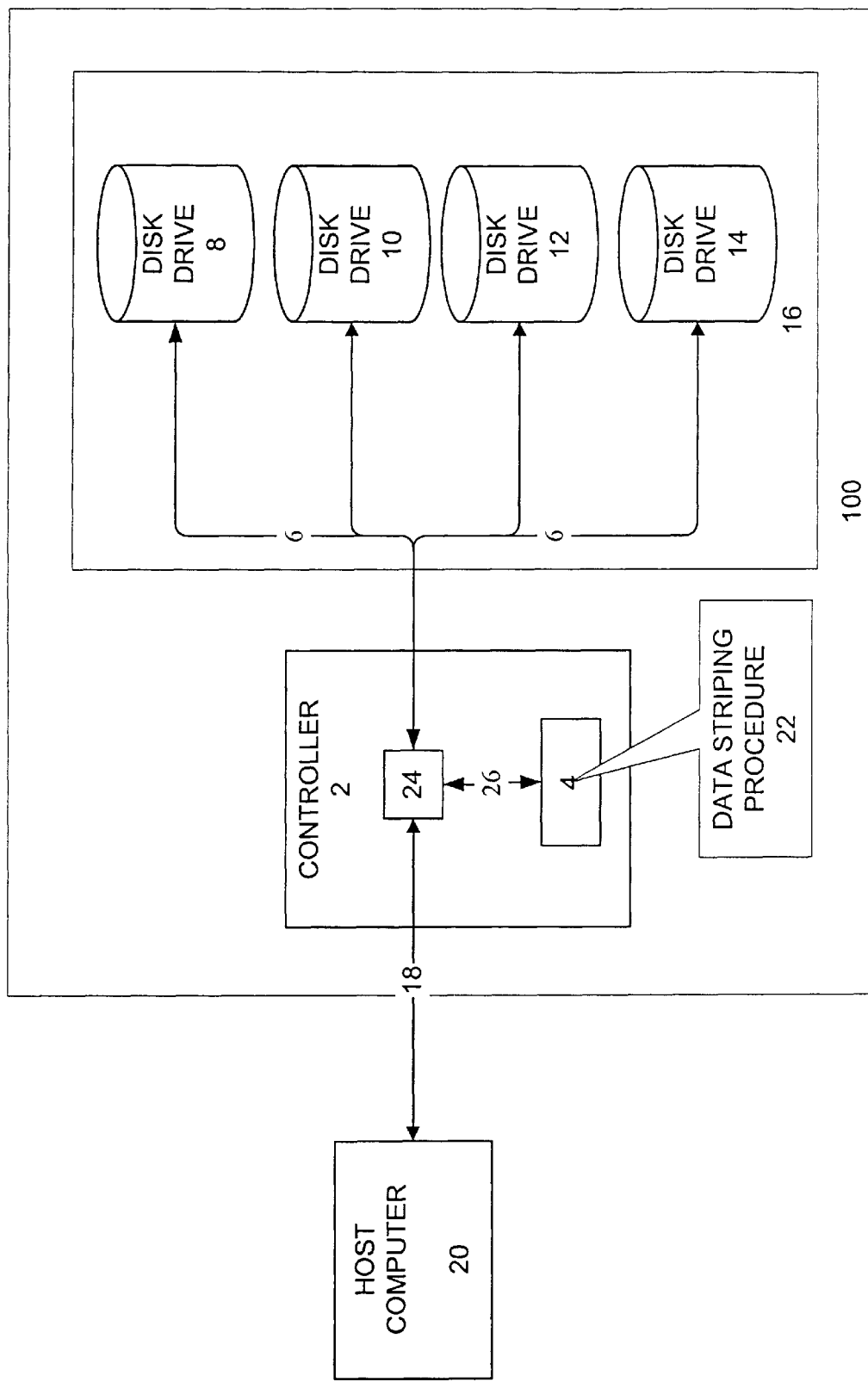
FIG. 1 is a block diagram illustrating aspects of an exemplary data storage system and an exemplary apparatus, according to one embodiment of the present invention; and, FIG. 2 is a block diagram illustrating aspects of data distributed across multiple disk drives according to an inventive data striping procedure, according to one embodiment of the present invention.

The present invention solves the problems associated with the trade-offs between reliability and I/O performance used in state of the art RAID levels. Controller 2 is coupled across I/O bus 6 to a plurality of disk drives 8–14 in RAID storage subsystem 16. I/O bus 6 can be one of several different types of I/O buses, including, for example, a parallel SCSI bus, an FC-AL bus, a Fibre Channel Fabric bus, a USB bus, or an IEEE 1394 bus.

The controller 2 includes CPU 24, which is operatively coupled to I/O bus 6 and I/O bus 18. I/O bus 6 and I/O bus 18 can each respectively be one of several different types of I/O buses, including, for example, a parallel SCSI bus, an FC-AL bus, a Fibre Channel Fabric bus, a USB bus, or an IEEE 1394 bus.

CPU 24 is also operatively coupled across local bus 26 to random access memory ("RAM")4. CPU 24 is for executing procedures stored in RAM 4, and for storing data in RAM 4. Such procedures in RAM 4 include, for example, an inventive data striping procedure 22, for striping data, from host computer 20, across the disk drives 8–14. Data striping procedure 22 does this in a manner that provides 100% fault tolerance if a disk drive 8–14 fails, and in a manner that provides speedier I/O performance as compared to the state of the art RAID level data striping techniques.

Data striping procedure 22 data both to and from disk drives 8–14 in response to I/O requests from the host computer 20. Such I/O requests include, for example, Small Computer System Interface (SCSI) read and write data requests, which are known in the art of computer programming. Data striping procedure 22 is discussed in greater detail below in reference to FIG. 3.

Figure 2:
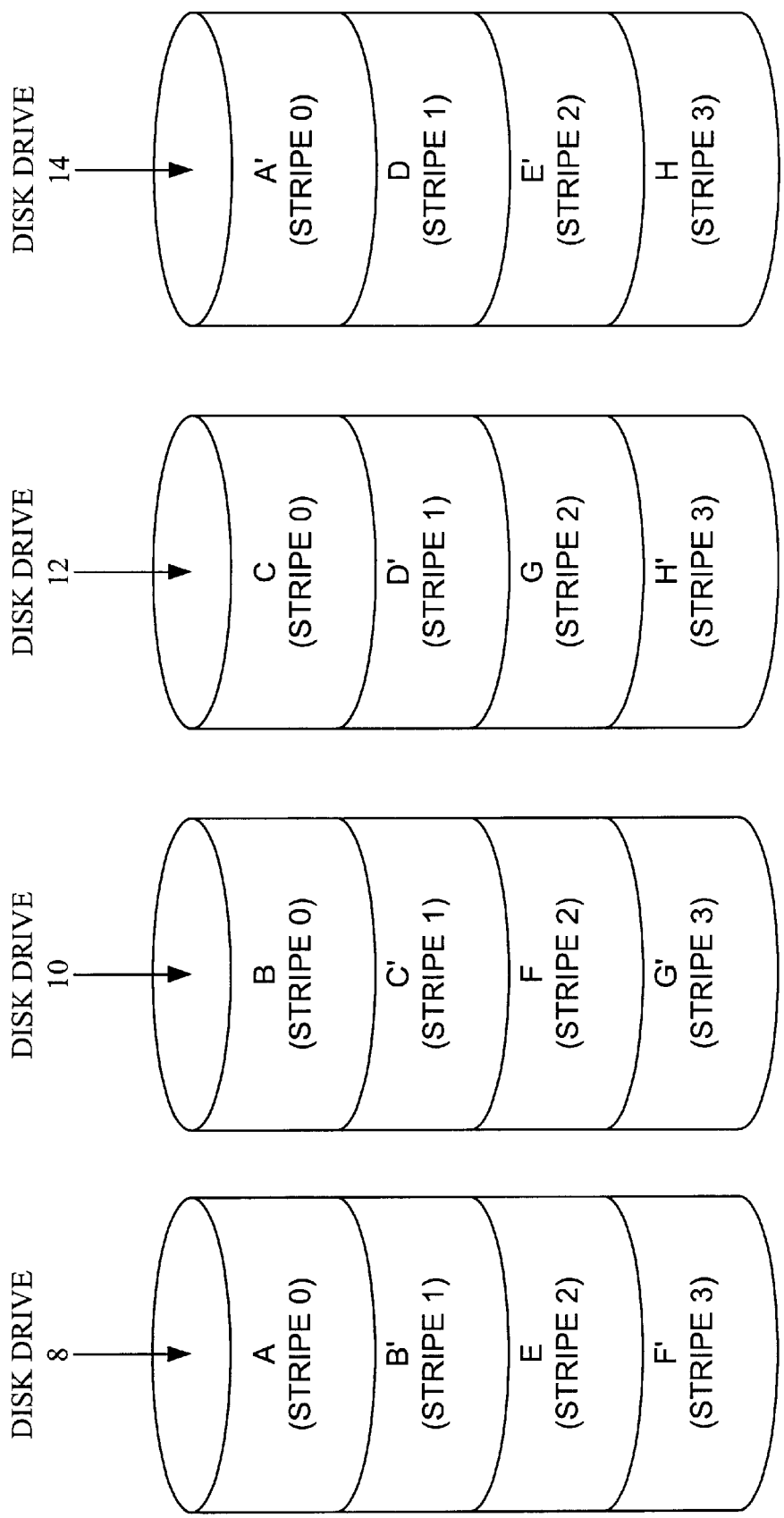

The operation of the invention is more filly appreciated with a simple example. Referring to FIG. 2, there is shown a block diagram that illustrates aspects of data striped across disk drives 8–14, according to one embodiment of the present invention. Even though this example illustrates an even number of disk drives 8–14, the present invention is scalable across either an even number or an odd number of disk drives 8–14. And, even though only four disk drives 8–14 are illustrated, in general, there may be an arbitrary number of disk drives 8–14, as long as the number of disk drives 8–14 is greater than two disk drives 8–14.

Each respective disk drive 8–14 includes multiple data segments A–G' (A–G' includes data segments A–G and data segments A'–G'). For example data segments A, B', E, and F are located on disk drive 8, and the like. Each data segment A–G' belongs to a particular stripe, each stripe 0–3 being designated with "(stripe X)", where "X" designates the particular stripe 0–3. For example, stripe 0 includes data segments A, B, C, and A'. Stripe 1 includes data segments B', C', D', and D, and the like.

Even though each disk drive 8–14 is only divided into four (4) data segments A–G', each disk drive 8–14 can be divided into an arbitrary number of data segments A–G', dependent upon the respective storage capacities of disk drives 8–14, and dependent only upon the amount of data written by host computer 20 (see FIG. 1) to disk drives 8–14. Similarly, even though only four (4) stripes 0–3 are illustrated, each disk drive 8–14 can be divided into an arbitrary number of stripes 0–3, dependent only upon the number of data segments A–G in a respective disk drive 8–14.

According to the data striping procedure 22, data are striped across disk drives 8–14 according to two rules, the first rule applying to stripes 0–3 that contain substantially original data in each data segment A–G', and the second rule applying to stripes that contain substantially duplicate data in the data segments A–G'. First data is striped according to the first rule, then data is striped according to the second rule, then data is striped according to the first rule, and the like, in an alternating manner.

According to the data striping procedure 22, the first rule applies to those stripes that have substantially original data in each data segment A–G'. This means that each data segment A–G' in the stripe 0–3, except for the last data segment A–G in the stripe 0–3, will contain original data. In the last data segment A–G' of the stripe 0–3, the data striping procedure 22 stores the duplicate of the data that is stored in the first data segment A–G of the stripe 0–3.

To illustrate the results of the first rule, consider that original data are stored in data segments A–C, respectively across disk drives 8–12 in stripe 0. A duplicate of the data stored in the first data segment A of the stripe 0 is stored in the last data segment A' of the stripe 0. The benefits of striping the data in this manner are described in greater detail below.

With respect to those stripes 0–3 that have substantially duplicate data in each data segment A–G', each data segment A–G' in the stripe 0–3, except for the last data segment A–G in the stripe 0–3, will contain duplicate data that corresponds to original data in the immediately preceding stripe 0–3, shifted to the left by one data segment A–G'. In the last data segment A–G' of this stripe 0–3, the data striping procedure 22 stores the original data of the duplicate data that is stored in the data segment A–G' that is immediately to the left of the last data segment A–G' in this stripe 0–3.

To illustrate the results of the second rule, consider that duplicate data are stored in data segments B'–D', respectively across disk drives 8–12 in stripe 1. The duplicate data in data segment B' on disk drive 8 is shifted to the left by one data segment A–G' in relation to the placement of the original data B in disk drive 10. Similarly, the duplicate data in data segment C' on disk drive 10 is shifted to the left by one data segment A–G' in relation to the placement of the original data C in disk drive 12, and the like. Original data that corresponds to the duplicate data stored in data segment D' on disk drive 12, is stored in data segment D on disk drive 14.

Striping data in this manner (according to the first and second rules) is beneficial for a number of reasons. One benefit is that read data requests result in an optimal data storage subsystem performance, because each disk drive 8–14, or spindle in the array comes into play to satisfy an read data request where the data is spread across each disk drive 8–14. For example, to read the data in data segments A–D each disk drive 8–14 will process the request. Therefore this data striping procedure is a viable solution for data storage subsystems that require exceptional sequential read data performance.

Another significant benefit of the present invention over the state of the art, is that sequential write data requests to controller 2 (see FIG. 1) from host computer 20 do not result in any backward writes. (The problems with backward writes are discussed in greater detail above). In fact sequential write data requests result in the desired data storage subsystem behavior, where the data, original or duplicate data, would always be stored on a disk drive 8–14 in a contiguous data segment A–G' with a higher LBA.

For example, in response to a write data request, disk drive 8 will store original data into data segment A. Disk drive 14 will store a duplicate of the data in data segment A'. Since A' was written to the first data segment (or LBA), no backward write was required. In response to another write data request, disk drive 10 will store original data into data segment B. Disk drive 8 will store a duplicate of the data in data segment B'. It can be seen that B' was written to a next contiguous data segment, the data segment having a higher LBA than data segment A in disk drive 8, thus, no backward write was required. This example can be extrapolated for each data segment A–G' in the disk drive 8–14 array. Because no backward writes are performed, this data striping procedure 22 (see FIG. 1) removes the rotational latency problems discussed in greater detail above with respect to the state of the art. Therefore this data striping procedure 22 is a viable solution for data storage subsystems that require exceptional sequential write data performance.

Another benefit of the present invention is that data striping procedure 22 is scalable across any number of disk drives 8–14, greater than two disk drives 8–14. This means that an even or odd number of disk drives 8–14 can be used.

In this manner, the present invention provides significant benefits over the state of the art, including, for example: (a) 100% fault tolerance if a disk drive 8–14 fails; (b) exceptional I/O performance for both sequential read data requests and for sequential write data requests from a host computer 20; and (c) the present invention is scalable across any number of disk drives 8–14, greater than two disk drives 8–14.

The foregoing descriptions of specific embodiments of the present invention are presented for purposes of illustration and description. They are not intended to be exhaustive or to limit the invention to the precise forms disclosed, obviously many modifications and variations are possible in view of the above teachings.

For example, the procedure of the data striping procedure 22 (see FIG. 1) is amenable for execution on various types of executable mediums other than a memory device such as a RAM 4. Other types of executable mediums can be used, such as but not limited to, a computer readable storage medium which can be any memory device, compact disc, or floppy disk.

The embodiments were chosen and described to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. An apparatus for distributing data across a plurality of disk drives, the apparatus comprising:

a memory having a data striping procedure stored therein, the data striping procedure including instructions for:

storing data across the disk drives, such that the data in data stripes that include substantially original data are distributed across the disk drives according to a first rule, and such that the data in data stripes that include substantially duplicate data are distributed across the disk drives according to a second rule, the data stripes having substantially original data being interleaved with the data stripes having substantially duplicate data; and a processor coupled to the memory, for executing the data striping procedure; and wherein the first rule data distributes data across the disk drives in a data stripe, such that a last data segment in the data stripe includes a duplicate of data that is stored in a first data segment of the data stripe, each other data segment, other than the last data segment, including original data.

2. An apparatus for distributing data across a plurality of disk drives, the apparatus comprising:

a memory having a data striping procedure stored therein, the data striping procedure including instructions for:

storing data across the disk drives, such that the data in data stripes that include substantially original data are distributed across the disk drives according to a first rule, and such that the data in data stripes that include substantially duplicate data are distributed across the disk drives according to a second rule, the data stripes having substantially original data being interleaved with the data stripes having substantially duplicate data; and a processor coupled to the memory, for executing the data striping procedure; and wherein the second rule data distributes data across the disk drives in a data stripe, such that a last data segment in the data stripe includes original data, the original data corresponding to duplicate data that is stored in a data segment that is immediately to the left of the last data segment, and such that each other data segment of the data stripe includes respective duplicate data that corresponds to respective original data that is stored in an immediately preceding stripe, each duplicate data being stored in a data segment that is one data segment to the left of a data segment storing the respective duplicate data's original data.

3. A computer program product for distributing data across a plurality of disk drives, the computer program product comprising a computer readable storage medium and a computer program mechanism embedded therein, the computer program mechanism comprising:

a data striping program module for striping data from a host computer across the plurality of disk drives, the program module including instructions for:

storing each of a plurality of data segments onto each of a plurality of disk drives, such that data segments in data stripes that include substantially original data are distributed across the disk drives according to a first rule, and such that data segments in data stripes that include substantially duplicate data are distributed across the disk drives according to a second rule, the data stripes having substantially original data being interleaved with the data stripes having substantially duplicate data; and wherein the first rule data distributes data across the disk drives in a data stripe, such that a last data segment in the data stripe includes a duplicate of data that is stored in a first data segment of the data stripe, each other data segment, other than the last data segment, including original data.

4. A computer program product for distributing data across a plurality of disk drives, the computer program product comprising a computer readable storage medium and a computer program mechanism embedded therein, the computer program mechanism comprising:

a data striping program module for striping data from a host computer across the plurality of disk drives, the program module including instructions for:

storing each of a plurality of data segments onto each of a plurality of disk drives, such that data segments in data stripes that include substantially original data are distributed across the disk drives according to a first rule, and such that data segments in data stripes that include substantially duplicate data are distributed across the disk drives according to a second rule, the data stripes having substantially original data being interleaved with the data stripes having substantially duplicate data; and wherein the second rule data distributes data across the disk drives in a data stripe, such that a last data segment in the data stripe includes original data, the original data corresponding to duplicate data that is stored in a data segment that is immediately to the left of the last data segment, and such that each other data segment of the data stripe includes respective duplicate data that corresponds to respective original data that is stored in an immediately preceding stripe, each duplicate data being stored in a data segment that is one data segment to the left of a data segment storing the respective duplicate data's original data.

5. A method for distributing data across a plurality of disk drives, the method comprising steps of:

receiving, by a controller, a plurality of write data requests from a host computer, each write data request including data:

in response to receiving the write data requests, storing, by the controller, the data across the disk drives according to a data striping procedure, such that data in data stripes that include substantially original data are distributed across the disk drives according to a first rule, and such that data in data stripes that include substantially duplicate data are distributed across the disk drives according to a second rule, the data stripes having substantially original data being interleaved with the data stripes having substantially duplicate data; and wherein the first rule data distributes data across the disk drives in a data stripe, such that a last data segment in the data stripe includes a duplicate of data that is stored in a data segment of the data stripe.

6. The method of claim 5, wherein each other data segment, other than the last data segment, includes original data.

7. A method for distributing data across a plurality of disk drives, the method comprising steps of:

receiving, by a controller, a plurality of write data requests from a host computer, each write data request including data;

in response to receiving the write data requests, storing, by the controller, the data across the disk drives according to a data striping procedure, such that data in data stripes that include substantially original data are distributed across the disk drives according to a first rule, and such that data in data stripes that include substantially duplicate data are distributed across the disk drives according to a second rule, the data stripes having substantially original data being interleaved with the data stripes having substantially duplicate data; and wherein the second rule data distributes data across the disk drives in a data stripe, such that a last data segment in the data stripe includes original data, the original data corresponding to duplicate data that is stored in a data segment of the data stripe.

* * * * *